No. 763,232. PATENTED JUNE 21, 1904.
W. C. WEISS.
AUTOSLEIGH.
APPLICATION FILED MAY 3, 1902.
NO MODEL.

Witnesses

Inventor
William C. Weiss

No. 763,232. Patented June 21, 1904.

UNITED STATES PATENT OFFICE.

WILLIAM C. WEISS, OF MILWAUKEE, WISCONSIN.

AUTOSLEIGH.

SPECIFICATION forming part of Letters Patent No. 763,232, dated June 21, 1904.

Application filed May 3, 1902. Serial No. 105,807. (No model.)

*To all whom it may concern:*

Be it known that I, WILLIAM C. WEISS, a citizen of the United States, residing at Milwaukee, in the county of Milwaukee and State of Wisconsin, have invented a new and useful Autosleigh, of which the following is a specification.

This invention relates generally to sleighs, and more particularly to an improved means for propelling the said sleigh, the object being to provide a propelling mechanism operated either by electricity, steam, or vapor after the manner of automobiles, thereby providing an autosleigh.

With this object in view the invention consists in the novel features of construction, combination, or arrangement, all of which will be fully described hereinafter and pointed out in the claim.

Figure 1:
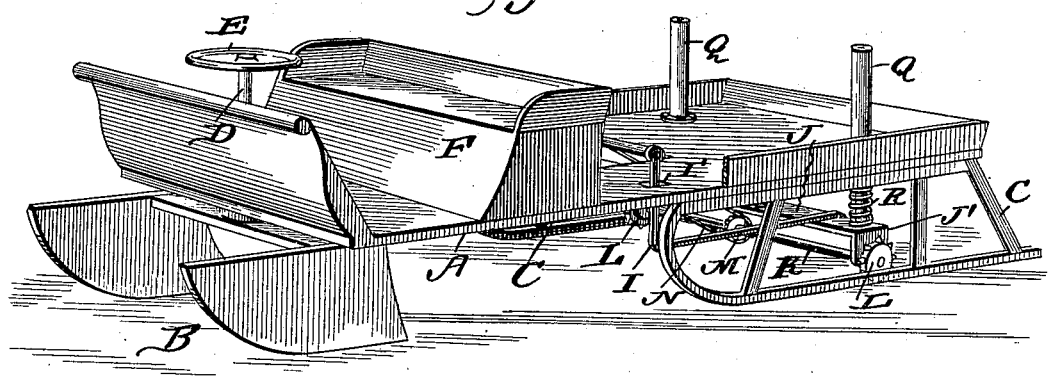
Figure 2:
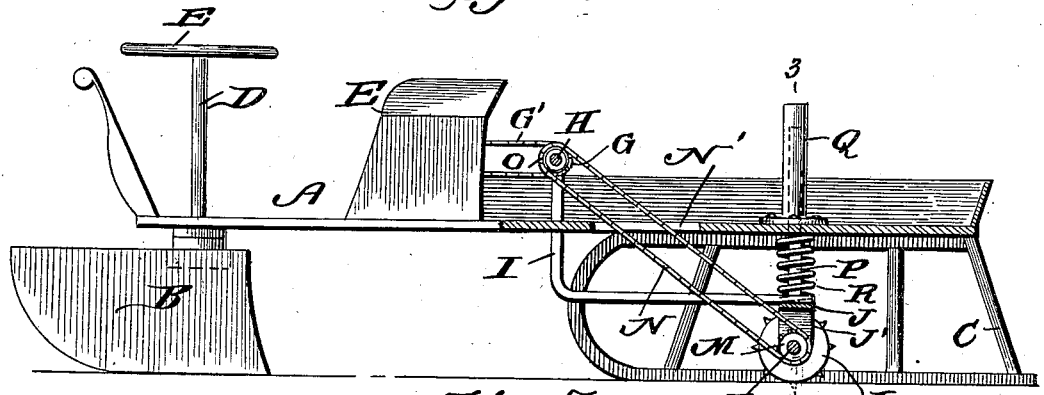
Figure 3:
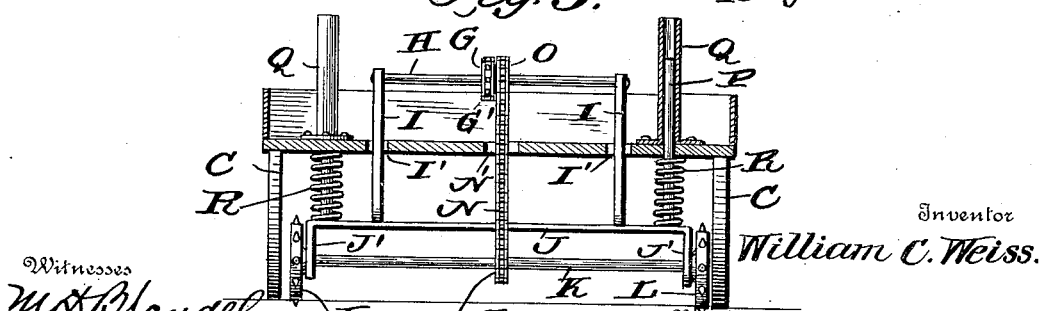

In the drawings forming a part of this specification, Figure 1 is a perspective view of a sleigh provided with my invention. Fig. 2 is a side elevation, partly in longitudinal section; and Fig. 3 is a transverse section taken on the line 3 3 of Fig. 2, certain parts being shown in elevation to more clearly illustrate the construction.

In carrying out my invention I employ a main frame A, which is supported upon the front runners B and rear runners C. The front runners being pivoted for the purpose of steering are operated by means of the steering-post D, having the steering-wheel E mounted at its upper end. The seat-box F is constructed and arranged to contain the motor, which may be electric, steam, or gasolene, which motor operates a sprocket-wheel G through the medium of the chain G', said sprocket G being mounted upon a shaft H, which is journaled between the upper ends of the angular arms I, which arms pass down through the main frame A, through the openings I', extend beneath the said frame, and are connected at their rear ends to the beam J, the ends J' of which are turned down to provide bearings for the axle K, carrying spiked wheels L at their outer ends. The axle K also has a sprocket M arranged thereon and over which passes a chain N, said chain also passing around the sprocket O, which is also mounted upon the shaft H, so that as the motor contained within the box F is operated the shaft H is revolved, and through the medium of the sprockets and chains the said motion is communicated to the axle K, and the spiked wheels, which engage the snow or ice, will propel the sleigh in a forward direction. In order to always hold the spiked wheels in contact with the snow or ice, so that the operation of the device will be steady and certain, I employ rods P, which are attached to the upper sides of the beam J adjacent to its ends and project upwardly through the main frame and work in sleeves or tubes Q, secured to the upper side of the main frame, and surrounding the rods between the beam J and the lower side of the main frame are the coiled springs R, the purpose of which is to normally project the beam J downwardly, thereby holding the spiked wheels in contact with the surface along which the sleigh is being propelled. Inasmuch as the beam J is attached to the arms I, which carry the shaft H, it is obvious that the chain N will always remain tight during any vertical movement of the axle K. The main frame is slotted at N' to permit the drive-chain N to pass through it.

It will thus be seen that I provide an exceedingly simple, safe, and efficient means for propelling a sleigh.

Having thus fully described my invention, what I claim as new, and desire to secure by Letters Patent of the United States, is—

In a device of the kind described, the combination with a sleigh having front and rear runners and a body portion mounted thereon, a cross-beam having downwardly-turned ends positioned between the rear runners, the said body portion being perforated above the cross-beam, sleeves secured on the body alining with said perforations, rods secured to the cross-beam and extending upward into said sleeves, an axle journaled in the ends of the cross-beam, wheels rigidly secured to the axle, a sprocket-wheel on the axle, a shaft above the body portion and supported by arms carried by the cross-beam, a sprocket on said shaft, a chain connecting the sprockets and means for driving the sprocket on the shaft.

WILLIAM C. WEISS.

Witnesses:
EDDIE WEISS,
ALFRED F. GROSS.